United States Patent [19]

Fima

[11] 4,184,145
[45] Jan. 15, 1980

[54] BRAKE APPARATUS USING LIGHT CONDUCTORS TO CONTROL REMOTE WEAR INDICATORS

[75] Inventor: Raoul G. Fima, Van Nuys, Calif.

[73] Assignee: Jumpak Products, Inc., Anaheim, Calif.

[21] Appl. No.: 828,818

[22] Filed: Aug. 29, 1977

[51] Int. Cl.² .................. B60Q 1/44; G08B 21/00
[52] U.S. Cl. .................. 340/52 A; 116/208; 188/1 A; 250/227
[58] Field of Search .............. 340/52 A, 380; 200/61.4; 188/1 A; 116/114 Q, 208; 250/227

[56] References Cited

U.S. PATENT DOCUMENTS

| | | | |
|---|---|---|---|
| 3,088,549 | 5/1963 | Borsa | 340/52 A |
| 3,588,811 | 6/1971 | Prickett | 340/52 |
| 3,593,266 | 7/1971 | Van Sickle | 340/52 A |
| 3,938,124 | 2/1976 | Way et al. | 340/280 |

Primary Examiner—John W. Caldwell, Sr.
Assistant Examiner—Joseph E. Nowicki

[57] ABSTRACT

A brake apparatus having a friction pad riveted to a brake shoe and a light conductor extending through the pad within its working thickness. As the pad is worn away, the light conductor is severed by the abrasive action of a rotatable member causing a remote indicator, responsive to the interruption of light transmission through the conduit, to signal the need to replace the pad. The configuration of the light conduit insures that the signal will be given at the appropriate time despite misalignment between the pad and the rotatable member.

12 Claims, 6 Drawing Figures

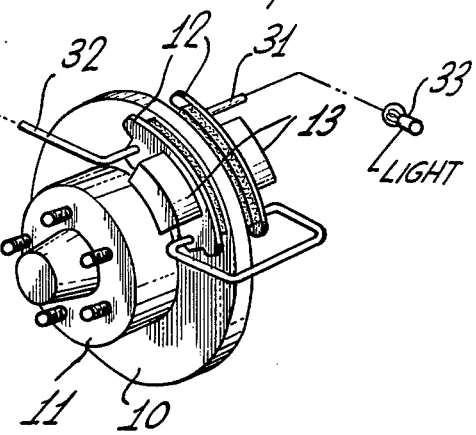
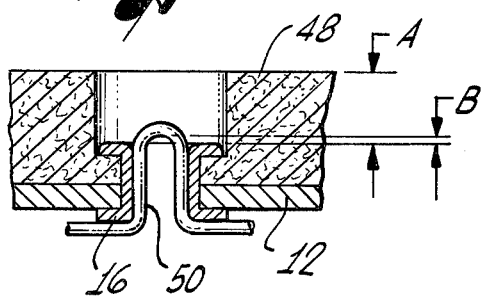
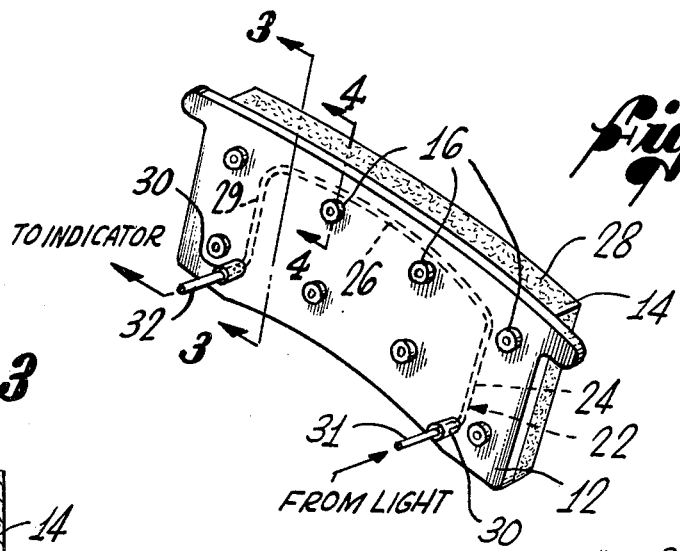
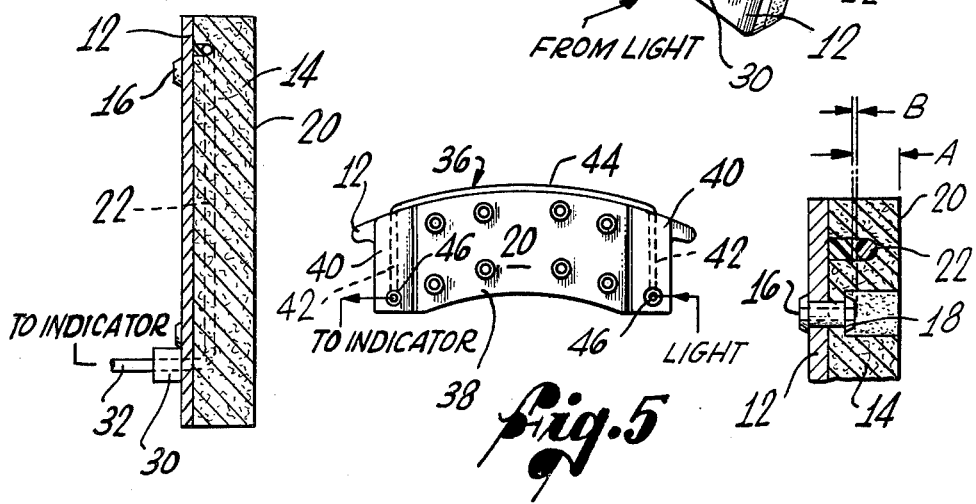

BRAKE APPARATUS USING LIGHT CONDUCTORS TO CONTROL REMOTE WEAR INDICATORS

BACKGROUND OF THE INVENTION

The present invention relates to brakes, and more particularly to a brake apparatus that provides a remote indication of the need to replace friction pads.

Brakes of the type used on automobiles, aircraft and other vehicles employ high friction brake pads attached by rivets to shoes which are connected to the vehicle frame so they cannot rotate. When the brake is applied, the shoe is moved to engage a smooth metal member in the form of a disk or drum that rotates with a wheel of the vehicle. Friction between the stationary pad and the rotating member provides the braking force. The friction surface of the pad is gradually worn away until the pad has been consumed and must be replaced.

If expensive repairs are to be avoided, it is imperative that the pads be replaced before they are worn to the point at which the rivets contact and score the rotatable member. The life expectancy of a pad may be predicted, within broad limits, based on the wear resistance of the material of which it is made and the working thickness between its original friction surface and the heads of the rivets. Nevertheless, variations in individual driving habits make accurate prediction of replacement intervals impossible. Most vehicles, therefore, require frequent visual inspection of brake pads, which is a time-consuming and inconvenient process, to guard against brake damage. Failure to inspect brake pads with sufficient frequency is not unusual.

It is therefore highly desirable to provide an indication on the instrument panel of the vehicle of the need to replace brake pads, thus eliminating the need for pad inspections. Various arrangements have been proposed to this end, one of which is described in U.S. Pat. No. 3,869,695, to Kita. It utilizes an electrical wire embodied in the pad and protruding above the level of the rivets so that it is severed by the action of a disk or rotor before the rotor contacts the rivets. An electronic circuit is responsive to the severance of this wire to produce an indication that the pad should be replaced. Unfortunately, the circuit is relatively complex and must remain active whenever the vehicle is in use to sense the severance. Rotor action is sensed only at the point where the wire is located and misalignment of the brake shoe may cause earlier contact with rivets at another portion of the pad, permitting the rotor to be damaged before any warning is given. Another disadvantage of the previously known system is that it requires a considerable quantity of copper wire, which is both expensive and heavy, connecting each wheel to the instrument panel.

An objective of the present invention is to provide an improved, relatively inexpensive and greatly simplified pad-wear indicator. Another objective is to provide such an indicator that reliably senses the need for pad replacement at the proper time regardless of any misalignment between the pad and the rotating brake member by which it is engaged.

SUMMARY OF THE INVENTION

The present invention provides a brake apparatus for motor vehicles that utilizes a light conductor to carry a signal indicating excessive wear from the brake pad to the instrument panel of the vehicle. Since the signal carried by the conductor is visible, the need for electronic circuitry to actuate an indicator can be completely eliminated. Moreover, the light conductor that carries the signal is light weight and relatively inexpensive.

More specifically, one form of the invention utilizes a light conductor recessed within the friction pad and parallel to the rotatable member by which it is engaged. The conductor thereby defines a severance level within the working thickness of the pad at which the rotatable member will contact and sever the conductor after a portion of the pad has been worn away.

In a preferred arrangement, illumination from a light source is supplied to one end of the conductor and then transmitted through the brake pad to a transparent or translucent display on the vehicle's instrument panel. So long as the conduit remains unsevered, the display remains illuminated, indicating that the brake pads are not in need of replacement.

Because the friction surface of a brake pad is not always properly aligned with the rotatable brake member, there is a danger that a conductor confined to an isolated area of the pad would fail to detect wear until rivets in a different area of the pad had already caused damage. For this reason it is advantageous to have the conductor extend substantially across the pad in two perpendicular directions. An alternative arrangement, particularly suitable for use with disk brakes, utilizes an elongated arcuate main section of conventional construction and two relatively narrow end pieces disposed at opposite ends of the main section. The conduit has two branches, each of which extends through one of the end pieces in a direction that is radial with respect to the motor.

In still another embodiment of the invention, the light conductor extends through hollow rivets that hold the pad to the brake shoe so that a portion of the conductor that projects from the rivet into the interior of the pad will be severed by the abrasive action of the rotor. Preferably, the same conductor extends through several such rivets in different areas of the pad to insure reliability in the event of misalignment.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a partially schematic, perspective view of an exemplary brake apparatus embodying many novel features of the present invention;

FIG. 2 is an enlarged, perspective view of the friction pad and brake shoe of the apparatus;

FIG. 3 is a further enlarged, sectional view of the pad and shoe taken along the line 3—3 of FIG. 2;

FIG. 4 is a still further enlarged, fragmentary, sectional view of the pad and shoe taken along the line 4—4 of FIG. 2;

FIG. 5 is an elevational view of an alternative pad and shoe arrangement; and

FIG. 6 is a fragmentary, sectional view of still another pad and shoe arrangement.

DESCRIPTION OF THE PREFERRED EMBODIMENT

An exemplary brake apparatus, illustrated in FIGS. 1-4 of the accompanying drawings, embodies many novel aspects of the present invention. It is a disk brake including a disk-like, metal rotor 10 attached to a wheel 11 of a motor vehicle for rotating with the wheel, and a pair of brake shoes 12 connected to the vehicle frame (not shown) and arranged one on either side of the rotor. When the brake has a sensor portion applied, a brake actuating mechanism 13 causes the brake shoes 12 to move axially toward the rotor 10, clamping the rotor between the shoes and providing the desired retarding force. Actual contact with the rotor 10 is made by friction pads 14, each attached to one of the shoes 12 by a plurality of rivets 16, as shown in FIG. 1.

The rivets 16 are recessed within the brake pads 14 to avoid contact with the rotor 10, and the distance between the rivet heads 18 and the flat friction surfaces 20 of the pads define the working thicknesses "A" of the pads, as indicated in FIG. 4. The friction surfaces 20 are, of course, subject to wear, and it is necessary, in this conventional brake construction to replace each pad 14 before its entire working thickness has been consumed and the rivets 16 contact the rotor 10, causing it to be scored and necessitating expensive repairs.

The brake apparatus uniquely indicates to the operator of the vehicle the need to replace the brake pads 14 at the appropriate time. As shown in FIGS. 2, 3 and 4, an elongated light conductor 22 is embedded within the friction pad 14 where it extends parallel to the friction surface 20. The conductor 22 is made of light transmitting plastic, such as Lucite or another material having the desired optical transmission properties. It has a straight first leg 24 extending in a generally radial direction along one end of the pad 14, a curved second leg 26 extending generally perpendicular to the first leg along an arcuate outer edge 28 of the pad and circumferentially with respect to the rotor 10, and a straight third leg 29 extending back from the second and parallel to the first along the opposite end of the pad (FIG. 2). The extension of the conduit 22 across a substantial portion of the pad 14 in two generally perpendicular directions insures that, regardless of any misalignment of the pad with respect to the rotor 10, the conduit will be severed before the rivets 16 in any area of the pad can contact and score the rotor.

As shown most clearly in FIG. 4, the severance level of the conduit 22, while closer to the rivets 16 than to the friction surface 20, is nevertheless spaced from the rivets so as to define a reverse thickness "B" at the bottom of the working thickness "A". This reserve insures that at the time the indication of a need for pad replacement is given, there remains a sufficient opportunity for the operator of the vehicle to seek convenient replacement of the pad 14 before damage to the rotor 10 occurs.

At each end of the light conductor 22 is a fitting 30 by which it is connected to one of two light transmitting cables 31 and 32. One cable 31 carries light from a light source 33 to the conductor 22 while the return cable 32 transmits the light to illuminate a remote indicator 34. So long as the indicator 34 remains illuminated, it may be safely assumed that a sufficient working thickness of the pad 14 remains to prevent scoring of the rotor 10 by the rivets 16. Once the pad 14 is, however, worn to the point at which the light conductor 22 is severed by the action of the rotor 10, the indicator 34 is extinguished, indicating the need for pad replacement.

It should be noted that while the return cable 32 may be arranged to illuminate a photoresponsive element (not shown), thereby electronically actuating an indicator, a much simpler and less costly arrangement is possible. The light from the cable 32 is used directly to illuminate the indicator 34 with no intervening circuitry.

Preferably the light source 33 is located, along with the indicator 34, at a central location such as the vehicle instrument panel. This arrangement permits the use of a single light source for all the brake pads 14 with which the vehicle is equipped, the cable 31/32 extending through each of the pads in series.

An alternative friction pad construction 36, shown in FIG. 5, utilizes a conventional arcuate pad as a main section 38 with two narrow elongated end pieces 40 epoxied to its opposite ends so that the end pieces are oriented in a generally radial direction with respect to the rotor 10. This three-piece pad 36 is secured to a shoe 12 and employed by the disk brake apparatus of FIG. 1, in generally the same manner as the one-piece pad 14 (corresponding components being designated by the same reference numbers used above with reference to FIGS. 1-4).

Each end piece 40 has a light conductor leg 42 extending across the pad 36 in a direction substantially aligned with a radius of the rotor 10. The legs 42 are connected along the top edge of the pad 36 by an exterior conductor section 44. At their opposite ends, the two legs 42 are connected to the source cable 31 and the supply cable 32 to transmit light from the lamp 33 to the indicator 34. As in the case of the pad 14 described above, the light conduit legs 42 are closer to the heads 18 of the plurality of rivets 16 that secure the main section 38 to a brake shoe 12 than they are to the friction surface 20, so that the conductor defines a reserve thickness.

It should be noted that misalignment of the three-piece pad 36 will not prevent early detection of the need for pad replacement since one or both of the conduit legs 42 will nevertheless be severed before the rivets 16 contact the rotor 10. If one end of the pad 36 is worn more quickly than the other, the leg 42 at the worn end will be severed first, whereas if the top or the bottom end of the pad is worn more quickly, then the appropriate ends of the legs will be severed.

The construction of the three-piece pad 36 is advantageous from a manufacturing viewpoint, since only the relatively small end pieces 40 need be specially fabricated to accommodate the conductor legs 42. Positioning of the legs 42 is easily accomplished since they extend in straight lines from two optical fittings 46 on the end pieces 40.

Another pad construction 48, interchangeable with the pad 14 and shown in FIG. 6, utilizes one of the conventional rivets 16, which is hollow, to provide access to its interior. A generally U-shaped section 50 of a light conductor 52 extends from the back of the shoe 12 through the rivet 16 to the severance level within the pad 48 and then loops back through the same rivet. When the pad 48 wears down to the point at which the protruding end of the inserted section 50 is broken, the indicator 34 signals the need for pad replacement.

As many of the rivets 16 as desired may be provided with inserted U-shaped conductor sections 50, the various sections being interconnected to form one continuous conductor. Inserted sections 50 may be located at diagonally opposite corners of each pad 48 to insure reliable detection of the need for pad replacement despite any misalignment between the pad and the rotor 10.

In summary, the invention provides a simple, inexpensive and light-weight apparatus that reliably indicates the need to replace worn brake pads 14, 36 or 48, giving advanced warning so that replacement can be effected conveniently before damage to the rotor 10 occurs. While a particular form of the invention has been illustrated and described, it will be apparent that various modifications can be made without departing from the spirit and scope of the invention.

I claim:

1. A disk brake apparatus for a motor vehicle including a rotor connected to a wheel of said vehicle for rotation therewith, a non-rotatable brake shoe connected to the frame of said vehicle and disposed adjacent said rotor, means for moving said brake shoe axially toward said rotor to apply a braking force to said wheel, a friction pad having a flat friction surface subject to wear substantially parallel to said rotor and positioned for engagement therewith, and a plurality of rivets by which said pad is attached to said shoe, said rivets being recessed within said pad away from said friction surface to define a working thickness of said pad so that said rivets can contact said rotor only after said working thickness has been removed by wear, wherein the improvement comprises:

a light source;
at least one continuous elongated light conductor leading from said light sensor and having an intermediate sensor portion recessed within said friction pad and parallel to said rotor to define a severance level at which said rotor will contact and sever said sensor portion after a part of said working thickness has been worn away, said severance level being within said working thickness and closer to said rivets than to said friction surface, thereby defining a reserve thickness between said severance level and said rivets which permits continued wear of said pad beneath said severance level before said rivets contact said rotor; and
display means connected to said light conductor at the end thereof opposite said light source for displaying, at a location remote from said pad and visible to the operator of said vehicle, an indication of the condition of said pad, said display means being responsive to the severance of said sensor portion to effect a change in said indication.

2. The disk brake apparatus of claim 1, wherein said sensor portion has a first leg that extends substantially radially with respect to said rotor and a second leg that extends substantially circumferentially with respect to said rotor.

3. The disk brake apparatus of claim 1, wherein said sensor portion extends substantially throughout the length of said pad in a circumferential direction with respect to said rotor.

4. The disk brake apparatus of claim 1, wherein said pad includes an arcuate main section and two end pieces epoxied to said main section, and said sensor portion includes two legs, each of which extends through one of said end pieces and is substantially radially oriented with respect to said rotor.

5. A wheeled vehicle having a brake apparatus including a brake member connected to a wheel of the vehicle for rotation therewith, a non-rotatable brake shoe disposed adjacent said brake member, actuator means for moving said brake shoe toward said brake member to apply a braking force to said wheel, and a friction pad subject to wear having a predetermined working thickness and attached to said shoe for engagement with said brake member upon operation of said actuator means, wherein the improvement comprises:

a light source mounted in said vehicle;
display means mounted in said vehicle in view of the operator thereof for providing a brake wear indication to said operator in response to the presence or absence of light from said light source; and
a light conductor extending continuously from said light source to said display means and arranged to supply light from said light source to said display means, said light conductor having an intermediate sensor portion secured to said brake shoe and said friction pad for movement therewith and extending parallel to said brake member to define a severance level within said working thickness of said pad, whereby said brake member will wear away and sever said sensor portion to interrupt the supply of light from said light source to said display means upon engagement with said sensor portion.

6. The brake apparatus of claim 5, wherein said sensor portion includes two legs that extend substantially across said pad, said legs being located at opposite ends of said pad.

7. The brake apparatus of claim 6, wherein said pad includes an arcuate main section and two relatively narrow end pieces, said legs extending through said end pieces.

8. The brake apparatus of claim 7, wherein said end pieces are epoxied to said main section.

9. The brake apparatus of claim 5, wherein said sensor portion extends substantially across said pad in a radial direction with respect to said rotatable member.

10. The brake apparatus of claim 5, wherein said sensor portion includes a leg that extends substantially radially with respect to said rotatable member and a leg that extends substantially circumferentially with respect to said rotatable member.

11. A multi-wheeled vehicle having a plurality of brake apparatus each including a brake member connected to a wheel of the vehicle for rotation therewith, a non-rotatable brake shoe member, actuator means for moving said brake shoe toward said brake member to apply a braking force to one of said wheels, and a friction pad subject to wear having a predetermined working thickness and attached to said shoe for engagement with said brake member upon operation of said actuator means, wherein the improvement in said vehicle comprises:

a common light source mounted in said vehicle;
display means mounted in said vehicle in view of the operator thereof for providing a brake wear indication to said operator in response to the presence or absence of light from said light source; and
a plurality of light conductors each arranged to provide a light path extending continuously from said light source to said display means, each of said light conductors having an intermediate sensor portion secured to one of said brake shoes and extending parallel to said brake member to define a severance level within said working thickness of said pad, whereby said brake member will wear away and sever said sensor portion to interrupt the supply of light from said light source to said display means upon engagement with said sensor portion.

12. The brake apparatus of claim 11, wherein said sensor portion includes a leg that extends substantially radially with respect to said rotatable member and a leg that extends substantially circumferentially with respect to said rotatable member.

* * * * *